United States Patent [19]

Baxter

[11] 4,279,034
[45] Jul. 14, 1981

[54] DIGITAL COMMUNICATION SYSTEM FAULT ISOLATION CIRCUIT

[75] Inventor: Leslie A. Baxter, Eatontown, N.J.

[73] Assignee: Bell Telephone Laboratories, Incorporated, Murray Hill, N.J.

[21] Appl. No.: 94,494

[22] Filed: Nov. 15, 1979

[51] Int. Cl.³ .................... H04Q 9/00; G08C 25/00
[52] U.S. Cl. .................... 371/8; 179/175.3 S; 340/147 SC
[58] Field of Search .................... 371/8, 9, 10, 24, 47; 370/16; 179/175.3 S, 175.3 R, 175.3 F; 340/147 SC

[56] References Cited

U.S. PATENT DOCUMENTS

| | | | |
|---|---|---|---|
| 3,409,875 | 11/1968 | De Jager et al. | 371/8 |
| 3,526,837 | 9/1970 | Zegers et al. | 371/8 |
| 4,159,470 | 6/1979 | Strojny et al. | 371/8 |

*Primary Examiner*—Thomas A. Robinson

*Attorney, Agent, or Firm*—David H. Tannenbaum

[57] ABSTRACT

There is disclosed, for use in a digital communication system, a fault detector circuit operable for removing faulty stations from the system. The disclosed circuit uses a distributed bypass isolation technique and may be used with individual stations or with groups of stations. A multi-bit delay register is connected across each station or station group and the output of the delay register is compared with the output of the parallel stations. When differences in the compared bits are detected the parallel stations are immediately isolated from the system and the bits from the delay register are placed in the system to preserve synchronism. This arrangement has the advantage of allowing immediate corrective action to occur to protect the sanity of the system. In situations where the system is divided into a voice digital bus and a data digital bus different error techniques may be employed for each bus.

5 Claims, 7 Drawing Figures

DIGITAL COMMUNICATION SYSTEM FAULT ISOLATION CIRCUIT

BACKGROUND OF THE INVENTION

1. Field of the Invention

This invention relates to digital communication systems and more particularly to such systems where it is desired to protect the system from faulty stations connected into the loop.

2. Description of the Prior Art

Digital communication systems are now becoming popular and are being particularly explored for use in situations where the various stations connected to the loop share a close physical proximity to each other. A signal correction arrangement is shown in co-pending patent application of C. R. Baugh, Ser. No. 91,406, filed Nov. 5, 1979. In the Baugh application, where is hereby incorporated by reference, there is disclosed a closed loop digital system having a time decay element inserted into the loop for the purpose of reducing unwanted signals to essentially zero. While the Baugh arrangement serves its intended purpose it only reduces those signals which are not reinforced by the station interface circuit. Thus, in situations where the interface circuit is faulty the erroneous information is continually placed on the loop thereby degrading the communication capability of the system.

One characteristic of digital loops is that synchronism must be preserved. Therefore, it is not feasible to merely remove a faulty station from a loop but rather steps must be taken to insure continued synchronism of the loop. In a copending patent application of Baxter-Cummiskey, Ser. No. 62,425, filed July 31, 1979 which application is hereby incorporated by reference, there is disclosed an arrangement for controlling digital loop synchronism. The Baxter-Cummiskey application does not deal with the problem of fault isolation.

Thus, a problem exists in that it is desirable to remove faulty stations or interface circuits from a digital loop system and to do so as soon as possible after an error occurs and to do so without elaborate control circuitry and without central processor intervention and in a manner which preserves synchronism of the loop.

SUMMARY OF THE INVENTION

I have solved the problem of localized fault isolation on a digital system by using a distributed bypass isolation technique which may be employed for individual stations or from groups of stations. In one embodiment a multi-bit delay register is connected across each station or station group and the output of the delay register is compared with the output of the parallel stations. When differences in the compared bits are detected the parallel stations are immediately isolated from the loop and the bits from the delay register are placed on the bus. This arrangement has the advantage of allowing immediate corrective action to occur to protect the sanity of the loop. In one embodiment, where the loop is divided into a voice digital bus and a data digital bus different error techniques may be employed for each bus.

Accordingly, it is one feature of my invention to arrange a digital loop communication system with a plurality of individual monitoring circuits arranged to determine the accuracy of information passing through the associated interface circuit and to isolate the associated station in the event of a detected error.

It is still another feature of my invention to both detect errors at a station or group of stations connected into a digital loop and to remove the faulty stations from the loop while maintaining synchronism around the loop at all times.

BRIEF DESCRIPTION OF THE DRAWING

These and other objects, features and problems are solved in one embodiment of our invention which will be more fully appreciated from a review of the drawing, in which.

DETAILED DESCRIPTION

Figure 1:
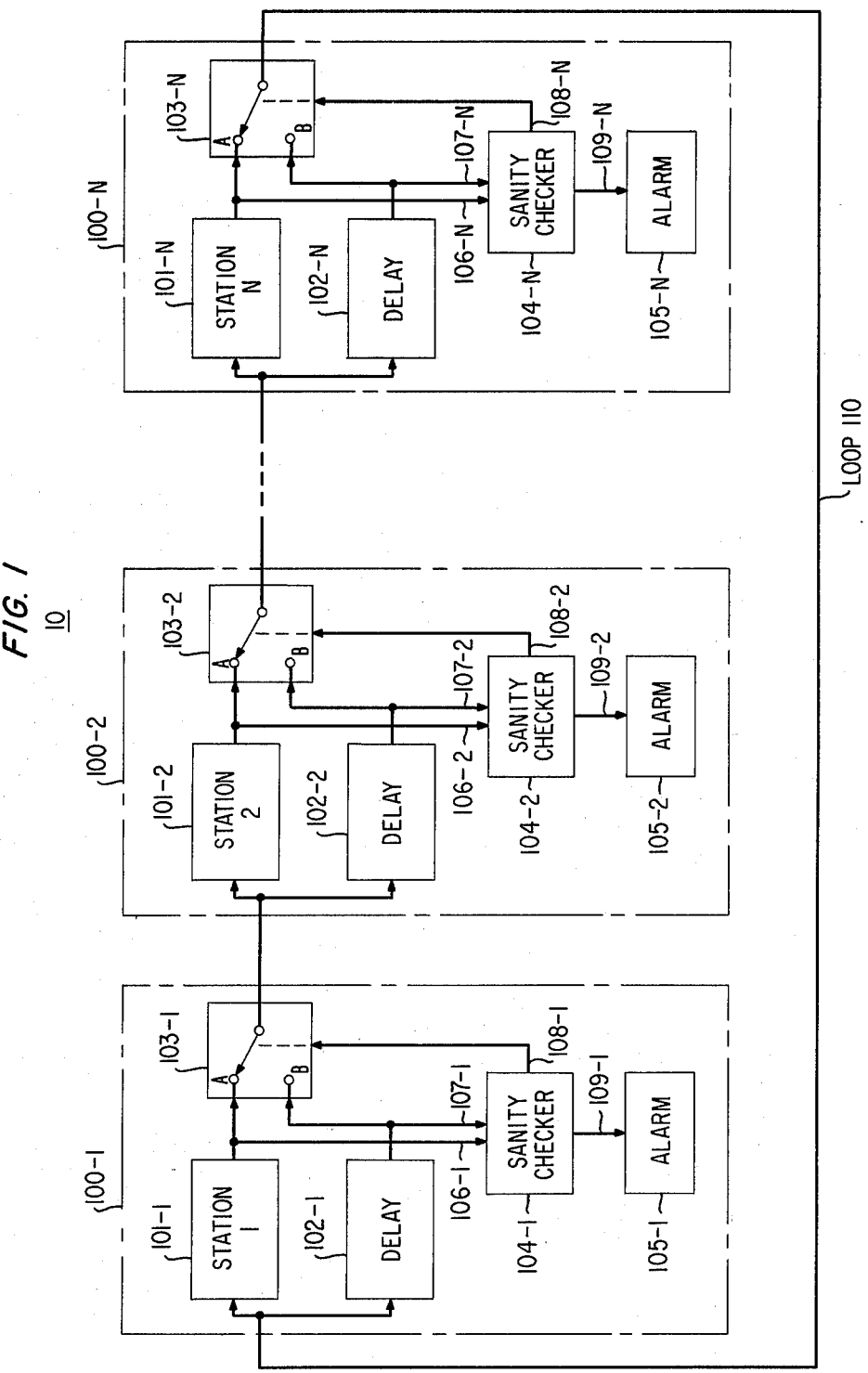
FIG. 1 shows in block diagram form several stations of a digital loop, each station having an individual fault isolation circuit associated therewith.

FIG. 1 shows the fault isolation circuit as used in loop communication systems. The loop (110) transmits digital information in a clockwise direction. This digital information passes through each station 101-1 to 101-N in sequence.

For each station, the fault isolation circuitry consists of a switch (103-), a delay circuit (102-), a sanity checker (104-) and an optional alarm (105-).

Delay circuit 102 delays the incoming bit stream by an amount equal to the delay incurred in passing through the associated station (101). This is typically 1-bit time. Sanity checker (104) compares the station's output at lead 106 with the output of delay circuit 107. When the sanity checker determines that the station has failed, it asserts line 108 which causes switch 103 to move to position B. Line 109 is also asserted activating alarm 105. The faulty station has now been removed from the loop, and an equal amount of delay, via delay circuit 102, has been substituted. Thus, the logical length of the loop has not changed, and the other stations will not lose synchronization.

Figure 2:
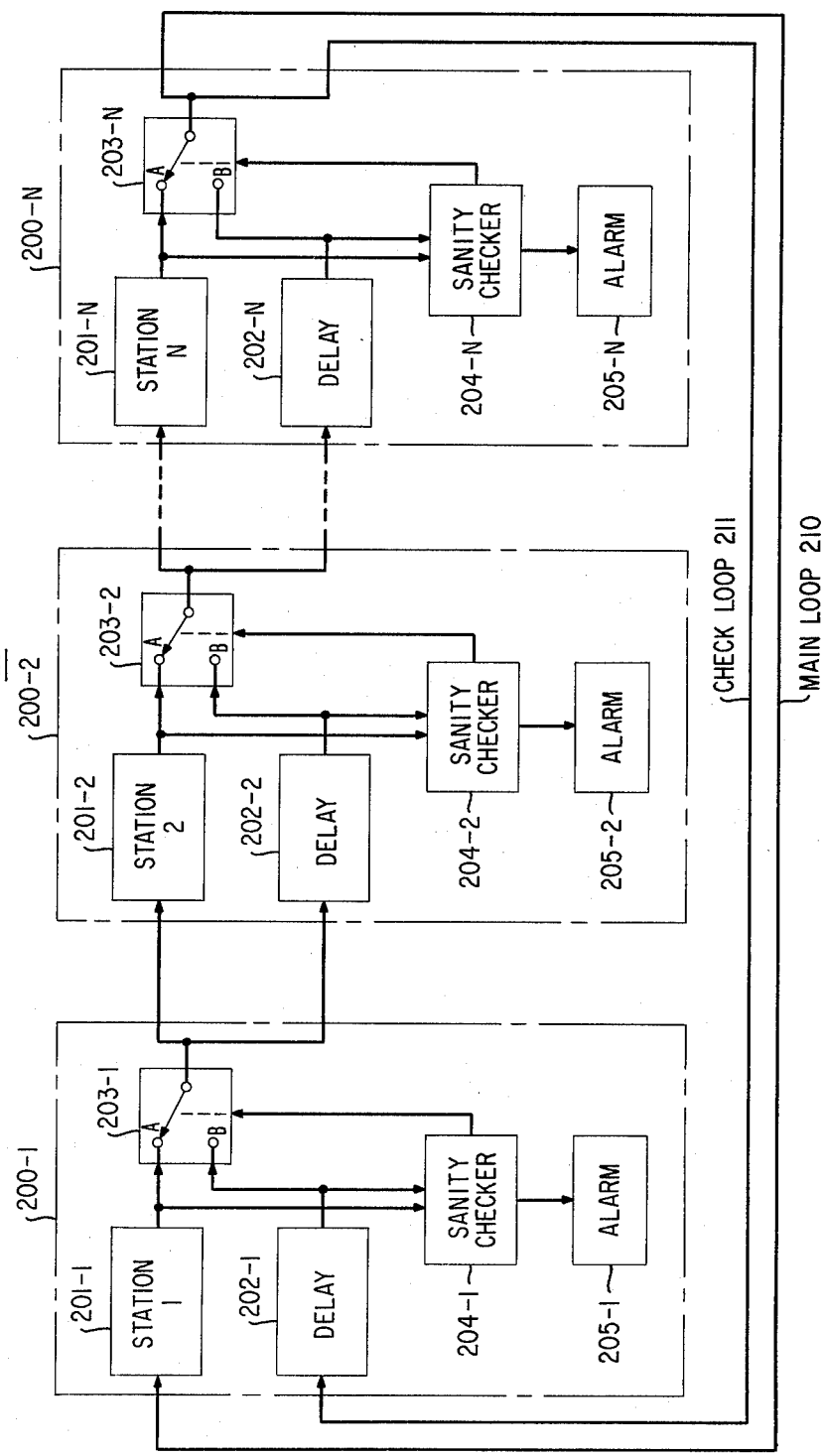
FIG. 2 is similar to FIG. 1 except the fault isolation circuits are arranged to check the path between the stations as well as the associated station.

The configuration shown in FIG. 1 is most useful for loop-start systems where there is negligible chance of the transmission link between stations failing. It may also be used to guard against station failures in distributed loop systems; however, it will not protect against transmission line failures. Another configuration for use in distributed loop systems is shown in FIG. 2. In this case, there is a main loop (210) for data transmission, and a check loop (211). If the main loop fails between stations, the sanity checker will now switch over to the check loop, between the affected stations.

Figure 3:
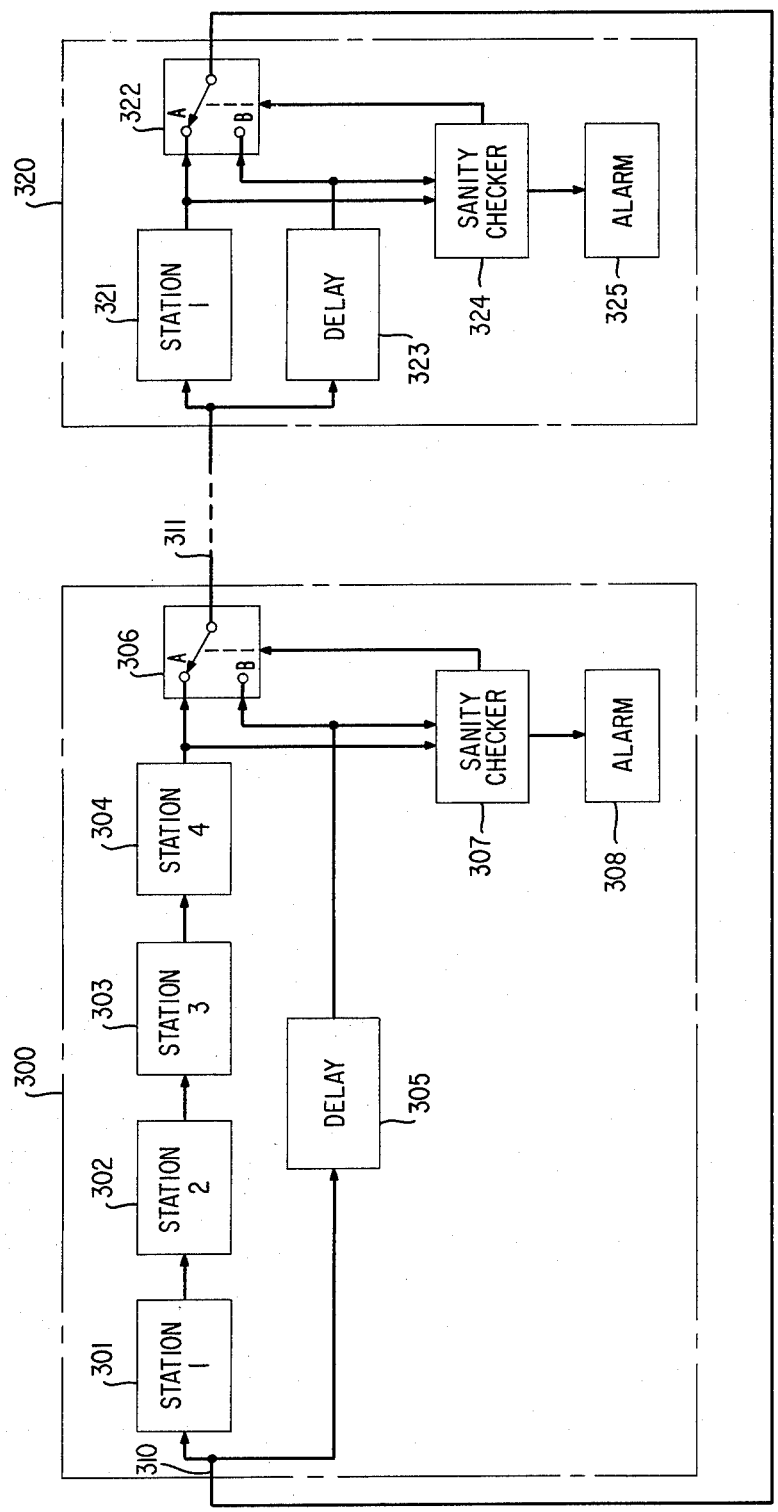
FIG. 3 shows, in block diagram form, a fault isolation circuit arranged to protect a group of digital stations.

In some situations it is not necessary for each station to have its own sanity checking circuitry. FIG. 3 shows an example where one sanity checker (307) is shared among four stations (301–304). In this case, delay circuit 305 must contain a delay equivalent to four stations. If any of the stations 301–304 fail, sanity checker 307 operates to cause switch 306 to switch to position B, removing all four stations from the loop.

Figure 4:
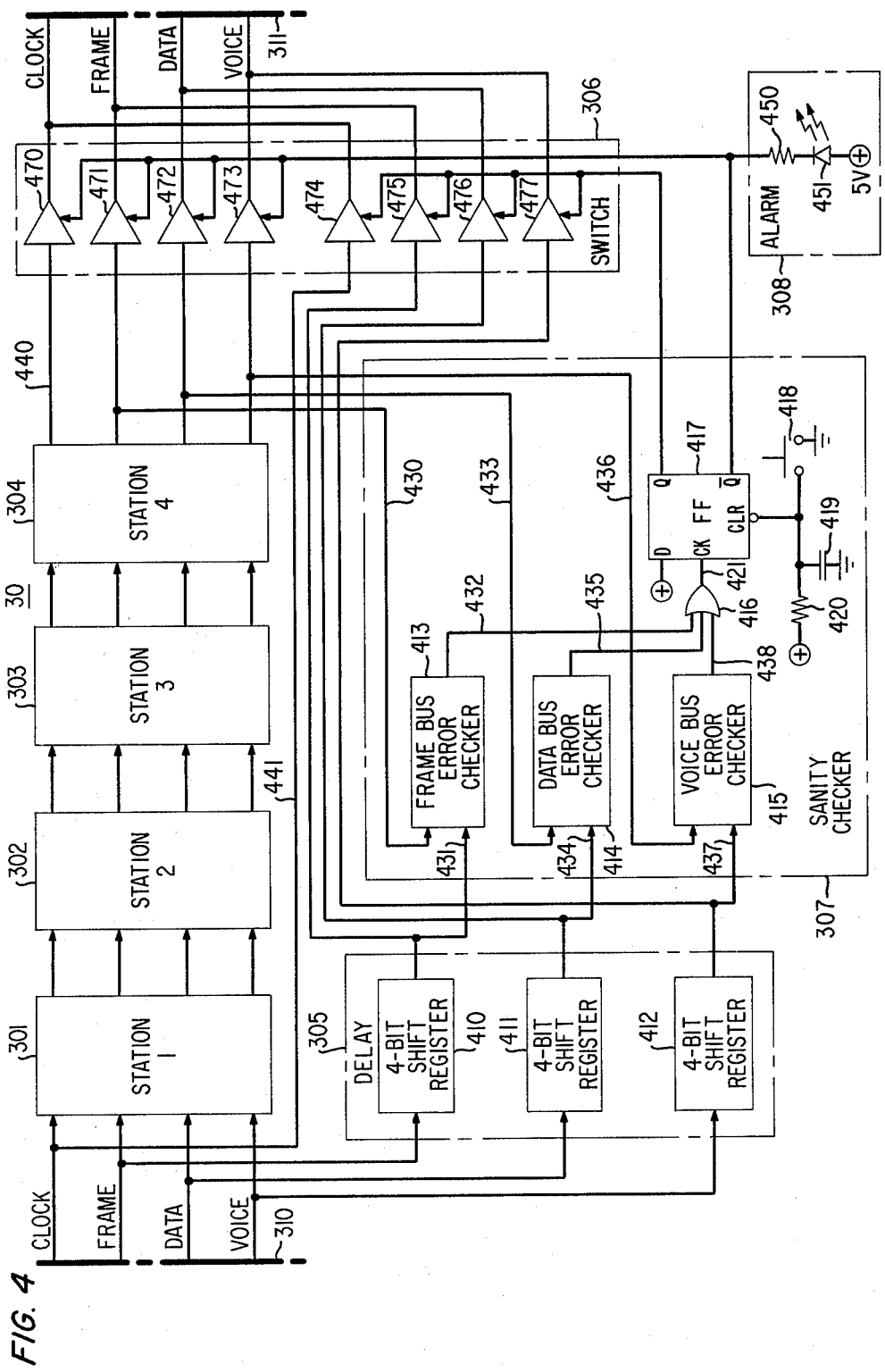
FIG. 4 shows a more detailed version of a fault isolation circuit adapted for both voice and data.

An example of a sanity checker applied to a specific system is shown in FIG. 4. For details on the operation of this system, reference is made to copending applications of Baugh et al Ser. No. 62,422, Baugh et al Ser. No. 62,423 and Baxter et al Ser. No. 62,425, all filed on July 31, 1979, which hereby incorporated by reference.

The system in FIG. 4 consists of four buses (310): CLOCK; FRAME; DATA; and VOICE. Four stations (301–304) are involved, thus delay circuit 305 is implemented using 4-bit shift registers (410–412). Switch 306 is implemented using standard tri-state buffers, such as Texas Instruments 74367. Alarm 308 may be either a visual indicator (451), or an audible alarm, or both. The alarm condition may be cleared by reset switch 418.

Figure 5:
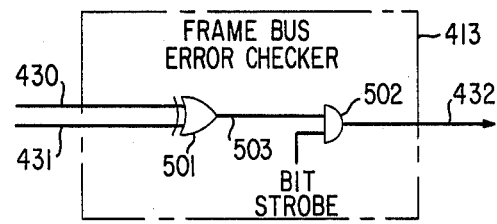
FIGS. 5, 6 and 7 shows in more detail the circuitry of the isolation circuit.

There are three error checkers which may set error flip-flop 417 by means of gate 416. FIG. 5 shows frame bus error checker 413, which compares the frame output 430 of station 304 with the output 431 of delay register 410. Gate 501 performs this comparison. When signals 430 and 431 differ, line 503 is asserted. The BIT STROBE signal is a narrow pulse which marks the center of each bit time. Gate 502 is used to prevent spurious glitches on line 503 from being passed through to the output. If the frame bit is lost, or an extraneous frame bit is generated, between stations 301 to 304, line 432 is asserted to signal the error.

Figure 6:
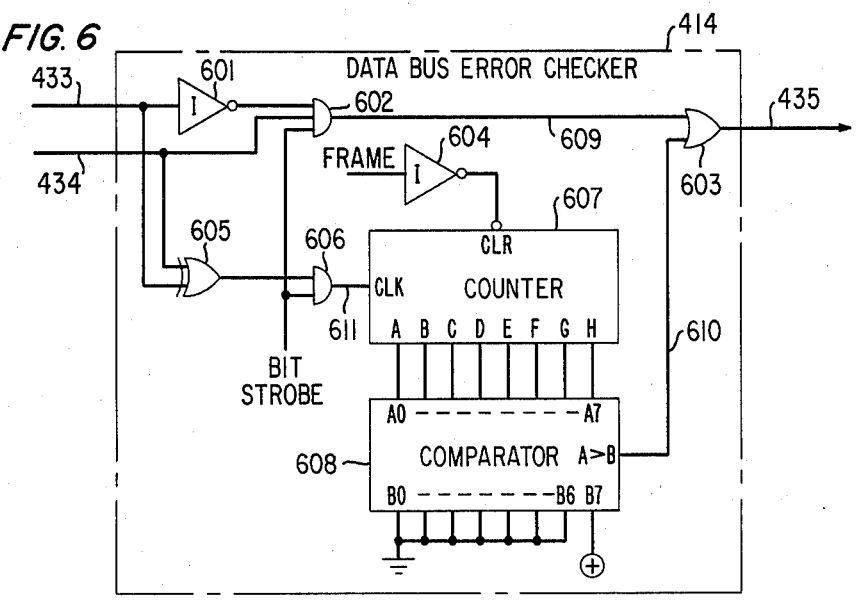

Data bus error checker 414 is illustrated in FIG. 6, and utilizes two particular characteristics of the data bus protocol in this system, as discussed in the aforementioned Baxter et al application, Ser. No. 62,425. The first error check involves counting the number of bits in each frame which differ between the output of station 4 and the output of delay register 411. This is performed via leads 433 and 434. Since there are 32 bits per time slot, and each station can use at most one time slot per frame, an error has occurred if more than 128 bits are changed in any frame. Gates 605 and 606 form a difference detector identical to frame bus error checker 413. Line 611 clocks counter 607 each time a differing bit is detected. The counter is reset at the start of each frame. If the count exceeds the value 128, comparator output 610 is asserted, causing line 435 to signal the error.

The second check is based on the fact that the stations may change bits on the data bus from 0 to 1, may never reset bits from 1 to 0 (this function is performed by the loop control Module). This check is implemented by gates 601 and 602. If the output 433 of station 4 is a 0, and the output 434 of delay register 411 is a 1, line 609 is asserted, causing line 435 to signal the error.

Figure 7:
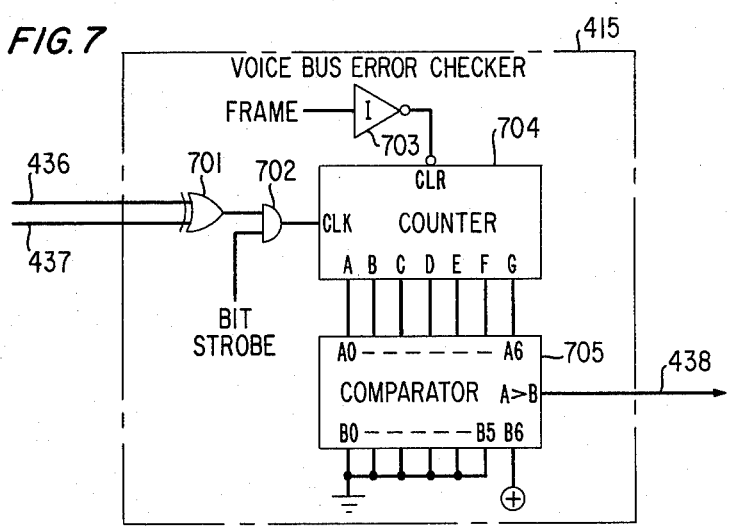

Voice bus error checker 415, (FIG. 7) is also a bit comparator and counter, except that the error threshold on comparator 705 is set at 64 because the voice time slots are only 16 bits long. If, in any frame, more than 64 bits differ between lines 436 and 437, line 438 will be asserted to indicate that an error has occurred.

Another error check which could be implemented on both the voice and data buses is to count the number of time-slots in which at least one bit is changed. This provides a more powerful error check, at the expense of slightly more hardware.

When any of the error lines FIG. 4 (432, 435, 438) are asserted, the output 421 of gate 416 goes high, setting error flip-flop 417. This enables the bottom gates 474–477 of switch 306 and disables the top four gates 470–473. Output bus 311 is then taken from signals 441, 431, 434, and 437 instead of from 440, 430, 433, and 436, respectively. The total amount of delay around the loop remains constant at all times, and thus there is no loss of synchronization by other stations in the system. It could also be possible to arrange switch 306 to that the individual gates work independently so that substitution of bits only occurs on the particular communication path where the error is found. In such a manner the entire station or group of stations need not be removed from the loop for a failure in only one of the communication paths. This would be accomplished by controlling the gates individually from the error checker circuits.

CONCLUSION

While the disclosed system is shown in conjunction with a closed digital loop the use of my invention is not limited to such a loop but may be employed in various circuit configurations where immediate error detection and correction are necessary. Those skilled in the art may use various permutations and expansions of my concept of error control without departing from the spirit and scope of my invention.

I claim:

1. A fault isolation circuit for use in a digital loop communication system having a plurality of stations, each station interconnected with a next preceding and a next succeeding station over a digital communication path, said stations separated into groups, each group containing at least one said station, said isolation circuit including delay means having a bit propagation delay time equal to the bit propagation time of the combination of said associated group of stations, means for propagating through said delay means data bits appearing at the input of said associated group of stations, means for comparing the output bits from said group of stations with said propagated delayed bits, and error detector means responsive to a detected error between said compared bits for isolating said output bits from said communication path and for substituting said propagated delayed bits on said communication path in place of said isolated bits.

2. The invention set forth in claim 1 wherein said error detector means includes means for counting the bit changes between the input and output of said associated group of stations, and means for comparing said bit changes against a preset acceptable number of said bit changes.

3. The invention set forth in claim 1 wherein said digital loop includes a plurality of individual communication paths interconnecting said stations and wherein said error detecting means is arranged to independently monitor the bits on each path.

4. The invention set forth in claim 3 further comprising a plurality of delay means each individually associated with each said path each means having a delay time equal to the bit delay propagation time of the combination of said associated stations, means for propagating through each said delay means data bits appearing on a particular one of said communication paths at the input of said associated group of stations, means for comparing the output bits on each communication path from said group of stations with said bits propagated through said associated delay means, and means responsive to a detected error between said compared bits on a particular one of said communication paths for isolating said output bits from said particular communication path and for substituting on said particular communication path said bits propagated through said associated delay means.

5. A communication system having a plurality of stations interconnected together in sequential fashion, said stations arranged into groups with each group containing at least one said station, said communication system including an isolation circuit associated with at least one of said station groups, said isolation circuit including means for comparing communication signal input to said associated station group with communication signal output from said associated station group, an auxiliary communication path arranged to process said input signals and to maintain synchronism between said input communication signals and said output communication signals, error detection means for detecting error between said compared communication signals, means responsive to a detected error for inhibiting said communication signal output and for substituting therefor communication signals from the output of said auxiliary communication path.

* * * * *

UNITED STATES PATENT AND TRADEMARK OFFICE
CERTIFICATE OF CORRECTION

PATENT NO. : 4279034

DATED : July 14, 1981

INVENTOR(S) : Leslie A. Baxter

It is certified that error appears in the above—identified patent and that said Letters Patent is hereby corrected as shown below:

Column 1, line 19, "where" should read --which--. Column 3, line 44, after "0 to 1," insert --but--. Column 4, line 2, "to", second occurrence, should read --so--.

Signed and Sealed this

Twelfth Day of July 1983

[SEAL]

Attest:

GERALD J. MOSSINGHOFF

Attesting Officer

Commissioner of Patents and Trademarks